United States Patent Office 3,138,579
Patented June 23, 1964

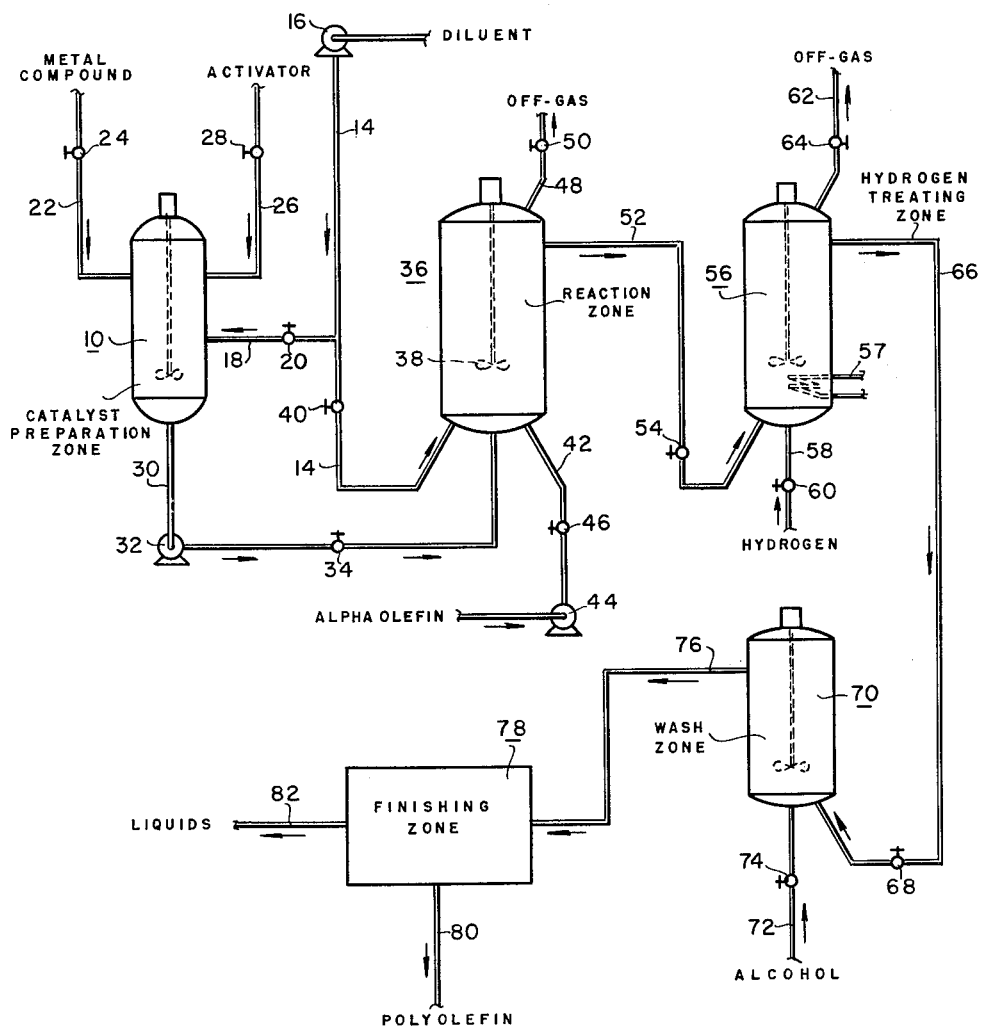

3,138,579
METHOD FOR PREPARING POLYOLEFINS OF REDUCED ASH CONTENT
William R. Cabaness, Jr., Abilene, Tex., assignor to Jefferson Chemical Company, Inc., Houston, Tex., a corporation of Delaware
Filed Dec. 22, 1960, Ser. No. 77,598
4 Claims. (Cl. 260—94.9)

This invention relates to a method for the preparation of normally solid high molecular weight thermoplastic polyolefins of reduced ash content. More particularly, this invention relates to a method for the treatment of a polyolefin slurry prior to the deashing of the polyolefin contained therein in order to improve the efficiency of subsequent deashing operations.

It is known to prepare high molecular weight normally solid thermoplastic polymers of alpha olefins by the polymerization of an alpha olefin in the presence of a stereospecific polymerization catalyst prepared by the activation of a transition metal halide of groups IVB, VB, VIB or VIII of the periodic table with high energy ionizing radiation or with a metal or a compound of a metal of groups I to III of the periodic table. Polymeriation catalysts of this nature are frequently referred to as "stereospecific" type polymerization catalysts.

Polyolefins prepared in this fashion are useful for a wide variety of purposes, such as, for example, as raw materials for the preparation of films, fibers and molded objects. Unfortunately, there is a tendency for residues from the polymerization catalyst to remain in the recovered polyolefins. This residue, commonly referred to as ash, adversely affects the physical properties of the polyolefin, and, in particular, adversely affects the thermal and oxidation stability of the polyolefin. Therefore, it is highly desirable to minimize the ash content of a finished polymer.

A number of expedients have been proposed for the accomplishment of this purpose. For example, it has been proposed to wash the recovered polymer with an alcohol or a related polar active compound in order to solubilize the catalyst residues for removal. While this step will significantly reduce the ash content of a finished polymer, the results still leave much to be desired.

It has now been discovered that the ash content of a polyolefin may be significantly reduced and that the oxidation stability of the polymer, itself, may be significantly improved through the provision of the process of the present invention; which may be briefly described as a method wherein a slurry of a polyolefin prepared by the diluent polymerization of an alpha olefin is pretreated with hydrogen prior to recovery and washing of the polyolefin.

The starting materials for the present invention include hydrogen, an alpha olefin, a non-polar organic diluent and a stereospecific polymerization catalyst.

The alpha olefin to be utilized as a starting material is preferably a $C_1$ to $C_{10}$ alpha olefin such as ethylene, propylene, butene-1, pentene-1, hexene-1, octene-1, isobutylene, 2-methyl-1-butene, 3-methyl-1-butene, 4-methyl-1-pentene, 4-vinylcyclohexene-1, butadiene, isoprene, etc., and mixtures of two or more such alpha olefins.

The non-polar organic diluent may suitably be an organic compound which is normally a liquid or which is a liquid at polymerization temperature and pressure including paraffinic, naphthenic, aromatic, etc., hydrocarbons and halogenated hydrocarbons, such as propane, butane, hexane, heptane, octane, isooctane, cyclohexane, cycloheptane, benzene, toluene, xylenes, chlorobenzene, etc., and mixtures thereof including petroleum hydrocarbon fractions such as saturated or aromatic or mixed aromatic-saturated fractions including heating oil fractions, gas oil fractions, paraffinic extract fractions, aromatic extract fractions, etc.

The stereospecific polymerization catalyst comprises a non-polar compound of a metal of group IVB, VB, VIB or VIII, wherein the metal is in less than the highest valence state thereof. The compound is activated by treatment with high energy ionizing radiation as disclosed, for example, in Schutze U.S. Patent No. 2,845,414 or with a group I to group III metal or metal compound as disclosed, for example, in the aforesaid Schutze patent.

The use of stereospecific polymerization catalysts and the polymerization of alpha olefins in the presence thereof is not a novel feature of the present invention and any suitable stereospecific polymerization catalyst known to those skilled in the art may be used to polymerize the alpha olefin under conditions also known to the art.

A preferred class of catalysts include titanium subhalides, such as titanium trichloride activated with an aluminum alkyl such as aluminum triethyl or diethyl aluminum chloride or both.

The polymerization reaction is conducted in the manner known to those skilled in the art under polymerization conditions such as those disclosed in aforesaid Schutze U.S. Patent No. 2,845,414. Preferably, such polymerization conditions include the use of a pressure within the range of about 0 to 1000 p.s.i.g., a temperature within the range of about 0 to 100° C. and an average contact time within the range of about 0.1 to 10 hours. The amount of diluent to be employed will normally be sufficient to provide a flowable slurry of polyolefin in the polymerization zone and, normally, from about 0.1 to about 0.0001 gram of transition metal are employed per gram of alpha olefin to be polymerized, the total weight of the catalyst being dependent upon the identity of the particular stereospecific catalyst composition.

The polymerization reaction may be conducted in a batchwise or continuous manner, as desired, in accordance with methods known to those skilled in the art.

The polymerization is advantageously effected by preparing a mixture of the polymerization catalyst composition and the diluent and by adding the alpha olefin to be polymerized to the mixture under desired polymerization conditions. As a result, a slurry of high surface area particles of normally solid high molecular weight thermoplastic polyolefin is formed in the polymerization zone.

In accordance with the present invention, this polymer slurry is treated with hydrogen at the end of the polymerization reaction either in the polymerization reactor or in a separate vessel. The hydrogen treating step may be conducted at any desired temperature or pressure. For best results, however, from about 5 to 50 atmospheres of hydrogen partial pressure are employed.

For the most efficient results it is desirable to depressure the slurry to atmospheric pressure prior to hydrogen treatment in order to remove as much of the unreacted monomer and other normally gaseous components of the reaction mixture as possible and to then pressure the slurry to the desired hydrogen partial pressure (which will preferably be the total pressure) at a temperature which is just below (i.e. 5° to 20° C. below the softening point of the polymer). The hydrogen treatment is preferably conducted with good mixing for a period of time within the range of about 0.1 to 10 hours and, still more preferably, to about 0.5 to about 5 hours.

At the end of the hydrogen treating step the slurry is depressured to atmospheric pressure, and the alpha olefin polymer is recovered (preferably in the absence of oxygen) by any suitable means such as decantation, filtration, centrifugation, etc. The thus recovered polymer, which will normally have a significant amount of the diluent associated therewith is then treated with a liquid polar active compound such as $C_1$ to $C_6$ aliphatic alcohol, glycol, etc. in order to solublize metallic residues.

The polymer after being washed is again recovered by any suitable method such as decantation, filtration, or centrifugation and is then finished (e.g. by drying the polymer, by adding oxidation inhibitors, etc. thereto and by pelleting of the polymer by extrusion).

The invention will be further illustrated by the accompanying drawing wherein the sole figure is a schematic flow sheet illustrating a preferred method for the continuous practice of the process of the present invention. Since the showing is schematic, auxiliary equipment such as valves, pumps, temperature and pressure control devices, etc. have not been shown with completeness since these features are conventional and not a part of the present invention.

Turning not to the drawing, there is shown a catalyst preparation zone 10 of any suitable construction known to those skilled in the art to which a non-polar organic diluent, such as a $C_6$ to $C_9$ paraffin, benzene or a $C_7$ to $C_8$ alkyl benzene is charged by way of a diluent charge line 14 containing a pump 16 and provided with a branch line 18 controlled by a valve 20. A transition metal compound such as titanium tetrachloride is charged through catalyst preparation zone 10 by way of a charge line 22 controlled by a valve 24 and an activator, such as triethyl aluminum is charged by way of a charge line 26 controlled by a valve 28.

The relative amounts of metal compound, activator and diluent to be charged and the activation conditions to be employed are known to those skilled in the art and, since they form no part of the present invention, are not recited in detail.

The catalyst composition prepared in zone 10 is discharged therefrom by way of a line 30 containing a pump 32 and controlled by a valve 34, the line 30 leading to a reaction zone 36 provided with suitable agitating means such as a motor driven impeller 38. An additional quantity of diluent may also be added if so desired through suitable setting of a valve 40 in a diluent charge line 14.

An alpha olefin to be polymerized, such as, for example, propylene is charged by way of an olefins charge line 42 containing a pump 44 and controlled by a valve 46.

Suitable polymerization conditions are established in the zone 36, including, for example, a temperature within the range of about 0° to 100° C. and a pressure from about 0 to 1000 p.s.i.g. Catalyst concentration residence time and alpha olefin charge rate are adjusted in the manner known to those skilled in the art.

As a consequence, the propylene is polymerized in zone 36 to provide a thermoplastic high molecular weight normally solid polymer which is present in the reaction mixture in the form of high surface area solid particles.

Off-gas, if any, is discharged from zone 30 by way of an off-gas line 48 controlled by a valve 50.

The liquid reaction mixture, comprising a slurry of polypropylene particles in diluent, together with minor quantities of catalyzer residue and other impurities, is discharged from reaction zone 36 by way of a discharge line 52 controlled by a valve 54 leading to a hydrogen treating zone 56. The hydrogen treating zone 56 is preferably sized and the rate of flow and withdrawal of slurry are correlated so as to provide an average residence time for the slurry in the zone 53 of about 1 to 5 hours. Suitable heating means, illustrated by a steam coil 57, may be provided for maintaining zone 56 at the desired temperature.

A pressure of about 5 to 50 atmospheres of hydrogen is established in the zone 56 by charging hydrogen thereto through a charged line 58 controlled by a valve 60. Hydrogen and other off-gas, if any, may be continuously or intermittently discharged from the zone 56 by way of an off-gas line 62 controlled by a valve 64.

The thus treated slurry is discharged from zone 56 by way of an off-gas line 62 controlled by a valve 64.

The thus treated slurry is discharged from zone 56 by way of a line 66 controlled by a valve 68 leading to a wash zone 70 wherein the slurry is treated with a polar-active compound such as a $C_1$ to $C_4$ alkyl alcohol in order to deactivate and solubilize the catalyst residue.

The polar-active compound for the zone 70 may be charged thereto by way of a line 72 controlled by a valve 74.

The product from wash zone 70 is discharged by way of a line 76 leading to a finishing zone 78 of any suitable construction wherein the polymer is recovered, dried, blended with additives such as antioxidants, etc., and compounded (e.g. by extrusion) to provide a finished polyolefin which is discharged by way of line 80.

Liquid components of the slurry may be removed from the finishing zone 78 by way of a line 82 for discard from the process or for recovery and recycle by any suitable means (not shown).

The invention will be further illustrated by the following specific examples which are given by way of illustration and not as limitations on the scope of this invention.

*Example 1*

To a 1-liter stirred autoclave was added 400 ml. of n-heptane, 1.0 ml. of titanium tetrachloride, 5.0 ml. of carbon tetrachloride and 0.95 gram of triethylaluminum in 10.0 ml. of heptane. The autoclave was sealed and flushed with ethylene. Polymerization was conducted at 50° C. and 50 p.s.i.g. of ethylene. After two hours, the ethylene pressure was vented to atmospheric, and the autoclave was pressured with hydrogen to 260 p.s.i.g. Also the temperature was increased to 80° to 90° C. (this temperature being within 5° to 20° C. below the softening point of the polymer). After several hours of this treatment, the catalyst was deactivated with isopropanol. The solid polyethylene (163 grams) was washed twice with isopropanol and allowed to dry in the air. The ash content was 0.043%.

*Example 2*

To a 12-liter autoclave was added 6 liters of dry heptane. The heptane was degassed by bubbling in ethylene for 45 minutes. The following reagents were added in the order: carbon tetrachloride, 20 ml.; triethyl aluminum, 2.04 g.; titanium tetrachloride, 1.7 g.; ethylene was added and the reaction was carried out for 3 hours at 50° C. and 50 p.s.i.g. ethylene pressure. Then an additional 0.91 g. of triethyl aluminum was added and the reaction continued for 3 more hours. After deactivating the polymer and washing with methanol the polymer was extracted with methanol for an extended period. The dried polymer weighed 472 g. and had an ash content (after this prolonged treatment) of 0.13%.

*Example 3*

To a 1-liter stirred autoclave was added 400 ml. of heptane which had been purged with ethylene. Next, 1.15 g. of triethylaluminum, 3 ml. of $CCl_4$, and 1 ml. of titanium tetrachloride were added. Ethylene was added while maintaining a pressure of 50 p.s.i.g. After 2 hours at 41–53° C. the unreacted ethylene was vented and hydrogen added to 600 p.s.i.g., and the slurry was heated for 1 hour at 600 p.s.i.g. and 80° C. (a temperature within 5° to 20° C. less than the softening point of the polymer). Diisopropanol was added, the polymer filtered and then washed twice with methanol (98 g. polymer, ash, 0.031%).

What is claimed is:

1. In a method for the organic diluent polymerization of an alpha olefin in the presence of a polymerization catalyst comprising an aluminum alkyl and a titanium halide to prepare a normally solid polymerized alpha olefin, wherein a reaction mixture is obtained comprising said diluent, said catalyst and an ash-containing, normally solid polymerized alpha olefin, the improved method for recovering said normally solid polymerized alpha olefin while reducing the ash content thereof which comprises the steps of treating said reaction mixture with hydrogen for a period of time within the range of about 0.1 to about 10 hours under treating conditions including from about 5 to about 50 atmospheres of hydrogen and a temperature within the range of about 5° to about 20° C. below the softening point of said polymer adding a liquid alcohol wash compound to said thus-treated reaction mixture and thereafter recovering said polymerized alpha olefin.

2. In a method for the organic diluent polymerization of an alpha olefin in the presence of a polymerization catalyst comprising an aluminum alkyl and a titanium halide to prepare a normally solid polymerized alpha olefin, wherein a mixture is obtained comprising catalyst and normally solid ash-containing polymerized alpha olefin, the improved method for recovering a normally solid polymerized alpha olefin of reduced ash content which comprises the steps of charging said mixture to a treating zone, treating said mixture in said treating zone for a period of time within the range of about 0.1 to about 10 hours at a temperature within the range of about 5° to about 20° C. below the softening point of said polymer with from about 5 to about 50 atmospheres of hydrogen, charging said hydrogen treated mixture to a wash zone, washing said hydrogen treated mixture in said wash zone with a polar-active liquid alcohol, charging said washed mixture to a finishing zone and recovering a finished normally solid polymerized alpha olefin of reduced ash content in said finishing zone.

3. In a method for the organic diluent polymerization of ethylene in the presence of a polymerization catalyst comprising an aluminum alkyl and a titanium halide to prepare a normally solid ash-containing polymerized ethylene, wherein a reaction mixture is obtained comprising catalyst and normally solid polymerized ethylene, the improved method for recovering a normally solid polymerized ethylene of reduced ash content which comprises the steps of pre-treating said reaction mixture prior to the washing of said polymerized ethylene with a liquid polar-active alcohol and prior to the recovery of said normally solid polymerized ethylene from said reaction mixture, said pre-treating step comprising a hydrogen treating step wherein said reaction mixture is treated with hydrogen for a period of time within the range of about 0.1 to about 10 hours under treating conditions including from about 5 to about 50 atmospheres of hydrogen and a temperature within the range of about 5° to about 20° C. below the softening point of said polymer.

4. In a method for the organic diluent polymerization of ethylene in the presence of a polymerization catalyst comprising an aluminum alkyl and a titanium halide to prepare a normally solid polymerized ethylene, wherein a reaction mixture is obtained comprising said diluent, said catalyst and normally solid ash-containing polymerized ethylene, the improved method for recovering a normally solid polymerized ethylene of reduced ash content which comprises the steps of charging said mixture to a treating zone, treating said mixture in said treating zone for a period of time within the range of about 0.1 to about 10 hours at a temperature within the range of about 5° to about 20° C. below the softening point of said polymer with from about 5 to about 50 atmospheres of hydrogen, charging said hydrogen treated mixture to a wash zone, washing said hydrogen-treated mixture in said wash zone with a polar-active liquid alcohol, charging said washed mixture to a finishing zone and recovering a finished normally solid polymerized ethylene of reduced ash content in said finishing zone.

References Cited in the file of this patent

FOREIGN PATENTS

| | | |
|---|---|---|
| 547,756 | Belgium | Nov. 12, 1956 |
| 807,204 | Great Britain | Jan. 7, 1959 |